T. VERNON.
NUT-LOCK.
No. 189,075.  Patented April 3, 1877.
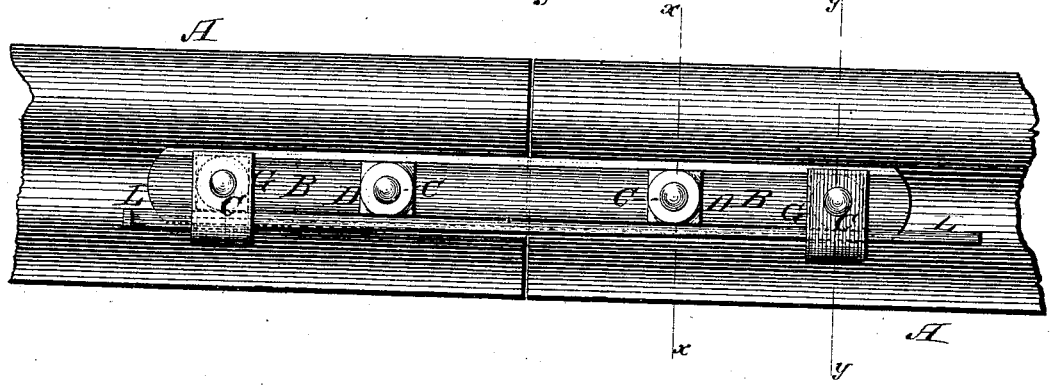
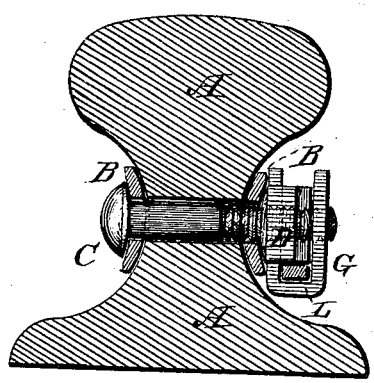
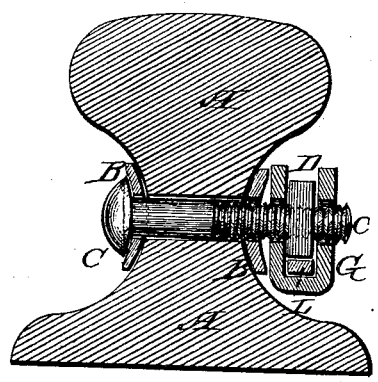
Witnesses:
P. C. Dieterich
Frank H. Duffy
Inventor:
Tinsley Vernon.
Per: C. H. Watson & Co. Attorneys.

UNITED STATES PATENT OFFICE.

TINSLEY VERNON, OF CHARLESTON, MISSOURI, ASSIGNOR TO ISAAC HISEY, OF WAYNESVILLE, OHIO.

IMPROVEMENT IN NUT-LOCKS.

Specification forming part of Letters Patent No. 189,075, dated April 3, 1877; application filed January 30, 1877.

*To all whom it may concern:*

Be it known that I, TINSLEY VERNON, of Charleston, in the county of Mississippi and State of Missouri, have invented certain new and useful Improvements in Nut-Locks; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a nut-lock, applicable especially for fish-joints on railroad-rails and other places where a series of nuts are in a line, as will be hereinafter more fully set forth.

In the annexed drawing, which forms a part of this specification, and fully illustrates my invention, Figure 1 is a side elevation of a fish-joint for railroad-rails embodying my invention. Figs. 2 and 3 are cross-sections of the same through the lines $x$ $x$ and $y$ $y$, respectively.

A A represent the ends of two adjoining railroad-rails, having the usual fish-bars B B along their sides crossing the joint, and the parts connected by means of a series of bolts, C C—usually four—passing through them, and nuts D D screwed up tightly on the ends of said bolts. Upon the end of the first and last bolt in the series is hung a metallic loop or stirrup, G, the nuts on said bolts being placed between the arms of the stirrups, as shown in Fig. 3.

L represents a long wedge-shaped key, passed through the first stirrup under the nut therein, and pushed under the intermediate nuts and through the stirrup on the last bolt under the nut therein, by which means all the nuts are locked in place, and cannot come off until the key is first removed.

The stirrups G may be made simply of short metal bars or straps, with a hole in each end, and then bent into proper form.

This invention is applicable to any article or place where a series of nuts are grouped together on a line.

In use the fish-plates are placed one on each side of the rail which the bolts pass through, nuts are placed upon center bolts, and the outer nuts with their stirrups are placed upon the screw-threads, and turned up tightly, which may be done before the key L is inserted. When the nuts are turned up tightly the key is inserted, as represented clearly in Fig. 1, by which means the nuts are held firmly in position.

Having thus fully described my invention, what I claim as new, and desire to secure by Letters Patent, is—

In combination with a series of bolts, C, with nuts D on their ends, the stirrups G G, placed on two of the bolts, with the nuts on them between the arms of the stirrups, and the elongated key L, substantially as and for the purposes herein set forth.

In testimony that I claim the foregoing as my own I affix my signature in presence of two witnesses.

TINSLEY VERNON.

Witnesses:
G. G. POLLARD,
H. C. McGRUDER.